(12) United States Patent
Leen

(10) Patent No.: US 6,581,583 B2
(45) Date of Patent: Jun. 24, 2003

(54) ENGINE INTAKE OFF GAS HEATER

(75) Inventor: John S. Leen, Carsonville, MI (US)

(73) Assignee: Huron, Inc., Lexington, MI (US)

( * ) Notice: Subject to any disclaimer, the term of this patent is extended or adjusted under 35 U.S.C. 154(b) by 0 days.

(21) Appl. No.: 10/146,757

(22) Filed: May 16, 2002

(65) Prior Publication Data

US 2002/0166548 A1 Nov. 14, 2002

Related U.S. Application Data

(63) Continuation-in-part of application No. 09/840,440, filed on Apr. 23, 2001, now abandoned.

(51) Int. Cl.[7] ............................................... F02M 25/00
(52) U.S. Cl. ....................................... 123/573; 123/574
(58) Field of Search .................................. 123/572, 573, 123/574, 41.86

(56) References Cited

U.S. PATENT DOCUMENTS

| | | | | |
|---|---|---|---|---|
| 4,050,430 A | * | 9/1977 | Amagai et al. | |
| 4,517,951 A | * | 5/1985 | Otaka et al. | |
| 4,768,493 A | * | 9/1988 | Ohtaka et al. | |
| 4,922,882 A | * | 5/1990 | Topfer | |
| 5,499,604 A | * | 3/1996 | Ito et al. | |
| 6,044,829 A | * | 4/2000 | Butz et al. | |
| 6,062,206 A | * | 5/2000 | Nelson et al. | 123/573 |
| 6,234,154 B1 | * | 5/2001 | Spix | |
| 6,412,479 B1 | * | 7/2002 | Canfield et al. | 123/573 |

* cited by examiner

*Primary Examiner*—Marguerite McMahon
(74) *Attorney, Agent, or Firm*—Harness, Dickey & Pierce, PLC

(57) ABSTRACT

In accordance with the teachings of the present invention, an off gas emission engine intake system is provided which uses engine cooling fluid to deliver warm emission gasses to the engine. The heater provides an outer body which has a channel therethrough. The channel is defined by an annular inner surface. An emission intake tube is disposed through the channel defining a toroidal chamber between the inner surface and air intake tube. The outer body further defines a pair of opposed orifices which accept coolant into the toroidal chamber. The system further has a lower extension tube which journally accepts the emission intake tube. A cylindrical chamber, coupled to the toroidal chamber, to further increase the contact area between the intake fluid.

19 Claims, 8 Drawing Sheets

ENGINE INTAKE OFF GAS HEATER

CROSS-REFERENCE TO RELATED APPLICATIONS

This application is a continuation-in-part of U.S. patent application Ser. No. 09/840,440 filed on Apr. 23, 2001 now abandoned. The disclosure of the above application is incorporated herein by reference.

FIELD OF THE INVENTION

This invention relates generally to internal combustion engines and refers more particularly to the heating system engine gasses traveling through a PCV valve into the air intake of the fuel vaporizing system for such engine.

BACKGROUND OF THE INVENTION

The operation of an automotive vehicle in climates where air temperatures are constantly frigid and in latitudes which are seasonally cold present an arduous problem for the handling of engine emissions. The problem of overcoming inefficient engine performance during cold weather operation imposes several important ramifications consequent the inherent characteristics of internal combustion engines. Numerous attempts have been made in the past to surmount the aforementioned problems by devising methods and apparatus to deliver warmer air at temperatures greater than that of outside air temperatures.

Current emission requirements require that off gasses from engine casings be returned into the intake of a vehicle to improve vehicle emissions. The coupling allows for the off gasses from the engine to be drawn into the emission intake tube 23 and allow them to be burned within the engine's combustion chamber.

Several of these systems include methods whereby exhaust gasses are circulated around an intake manifold to increase the temperature of the incoming air through the intake. These systems, which have the disadvantage of having to transfer heated exhaust gasses into the air intake system, and then back into the exhaust system, cannot handle crank case emissions which travel through the PCV valve of the engine into the engine's air intake.

SUMMARY OF THE INVENTION

In accordance with the teachings of the present invention, an engine air intake heat exchanger is provided which uses engine cooling fluid to warm the engine block off gasses which are introduced into the engine air intake. The heat exchanger provides an outer body, which has a channel therethrough. The channel is defined by an annular inner surface and a pair of orifices. An emission intake tube is disposed through the channel defining a toroidal chamber between the inner surface and emission intake tube. The outer body further defines a pair of opposed orifices which allows the flow of coolant into and out of the toroidal chamber. The heat exchanger further has a lower extension tube which journally accepts the emission intake tube. A cylindrical chamber, fluidly coupled to the toroidal chamber, is defined therebetween. The PCV valve is incorporated into the channel.

The heater exchanger further provides a hexagonal outer body which has the channel therethrough. An emission intake tube is disposed through the channel defining a chamber between the inner surface and emission intake tube. The outer body further defines a pair of opposed orifices having input ports, which provide ingress and egress for engine coolant fluid. The heat exchanger's lower extension tube journally accepts the emission intake tube. All components are brazed or soldered together to fluidly seal the input ports to the first toroidal chamber while keeping the air intake fluidly separated from the first toroidal and cylindrical chambers. Several constructions are disclosed which facilitate the coupling of the various heat exchanger members.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENTS

Figure 1:
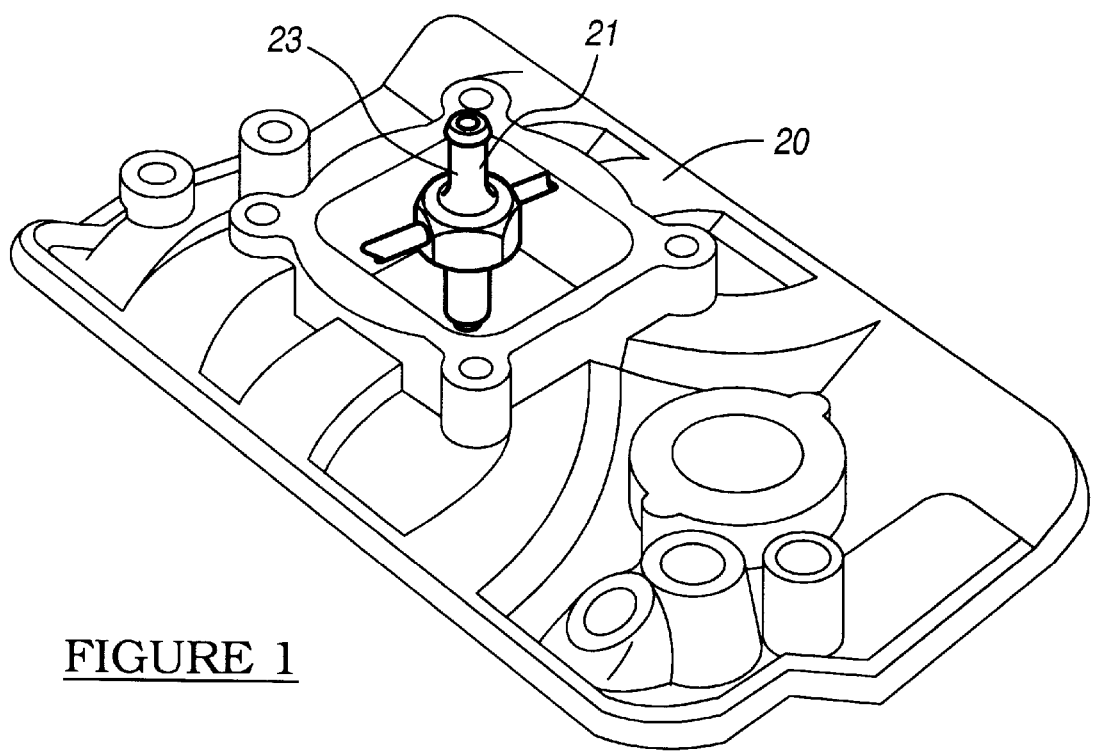
FIG. 1 depicts emission intake heater coupled to an engine air intake manifold.

FIG. 1 depicts the off gas intake heater 21 coupled to an engine air intake manifold 20. The off gas intake heater 21 has a PCV or emission intake tube 23 for bringing the engine off gasses into the combustion chambers of the engine. The off gas intake heater 21 functions to bring heated engine coolant into contact with the emission intake tube 23, thus increasing the temperature of the incoming emissions by increasing the temperature of the emission intake tube 23.

Figure 2:
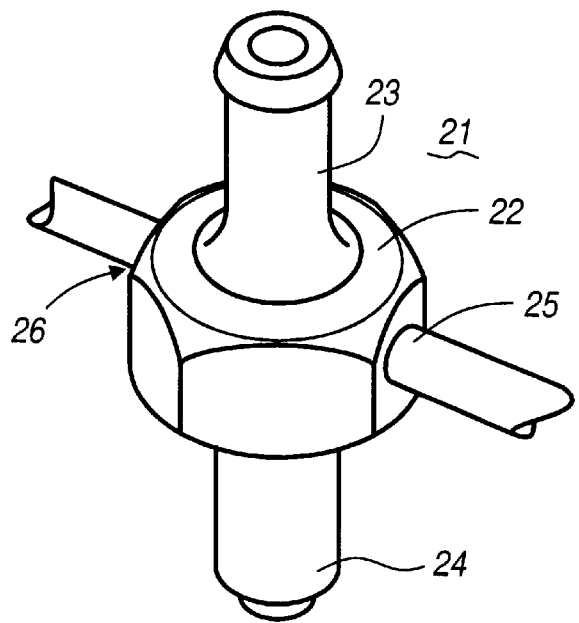
FIG. 2 is a perspective view of the emission intake heater of the present invention.
Figure 3:
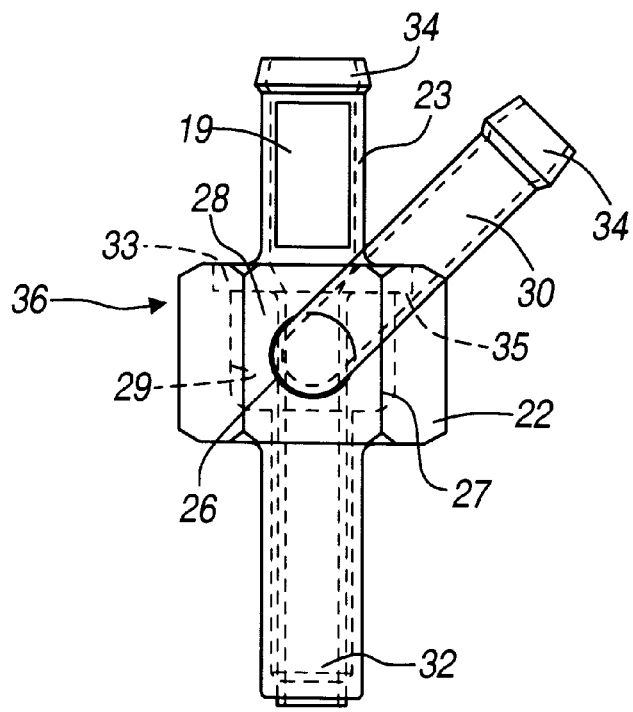
FIGS. 3 and 4 depict side and front views of one embodiment of the invention.

As best shown in FIGS. 2 and 3, the off gas intake heater 21 is defined by a generally annular outer body 22. The outer body 22 defines a cavity therethrough 28. The cavity 28 accepts the emission intake tube 23 and is defined by an annular inner surface 29. The emission intake tube 23, which is disposed through the cavity 28, defines a toroidal chamber 27 between the inner surface 29 and emission intake tube 23 and functions to hold the integral PCV valve 19. The outer body 22 further defines a pair of opposed orifices 25 and 26, which accepts coolant into the toroidal chamber 27.

The off gas intake heater 21 has a lower extension tube 24 which journally accepts the emission intake tube 23. A cylindrical chamber 32, which is fluidly coupled to the toroidal chamber 27, is defined by the emission intake tube 23 and the lower extension tube 24. The lower extension tube 24 is fluidly sealed by brazing on one side to the outer body 22. At its other end, it is brazed to the emission intake tube 23. The lower extension tube 24 has an external thread for fastening the off gas intake heater 21 to the intake manifold 20. It is envisioned that the surface of the emission intake tube 23 can be textured by threads or fins to increase heat exchange with the cooling fluid.

Figure 4:
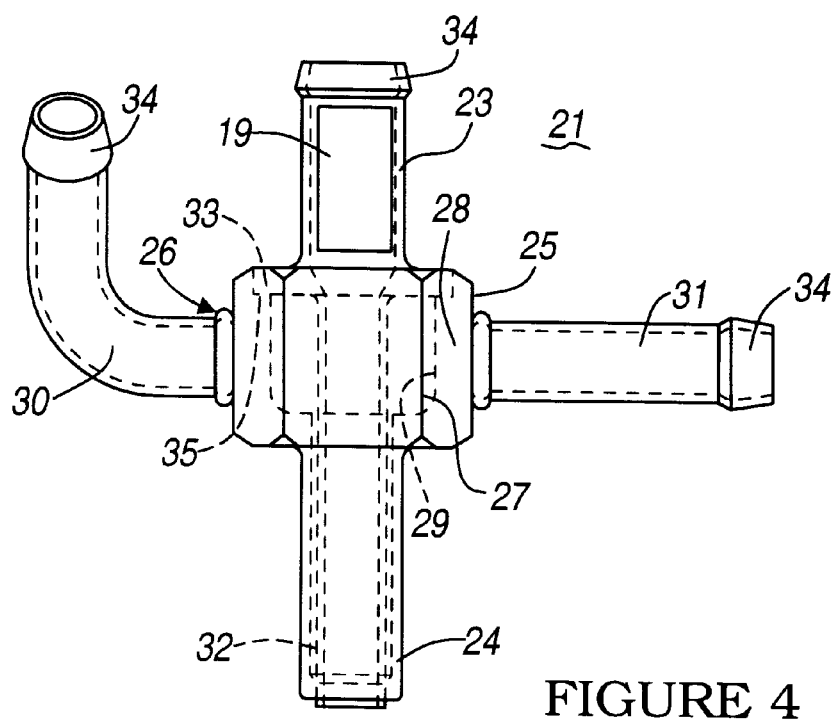

FIGS. 3 and 4 depict side and front views of a second embodiment of the invention. The emission intake tube 23 has a flange 33, which corresponds to seat 35 formed in an upper portion 36 of the outer body 22. The flange 33 and seat 35 are brazed together to couple and fluidly seal the components. Further depicted are hose coupling regions 34 on intake and output ports 30 and 31.

Figure 6:
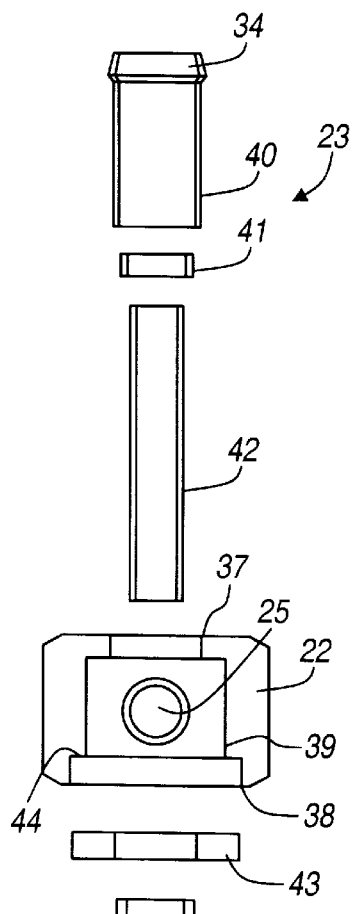
FIG. 6 depicts an exploded view of the embodiment as shown in FIG. 5.
Figure 6:
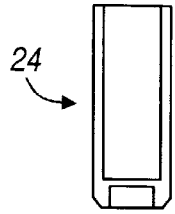
Figure 5:
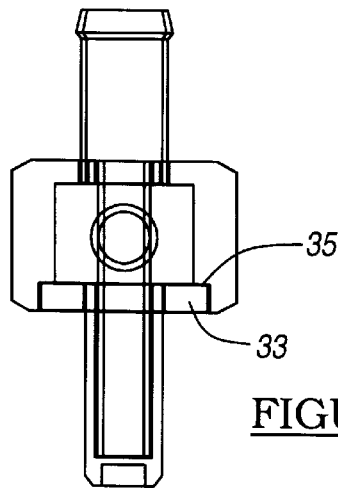
FIG. 5 depicts a side view of one embodiment of the current invention.

FIG. 5 depicts a side view of one embodiment of the current invention wherein the lower extension tube 24 is mounted to the outer body 22 by a flange 33 mounted to a seat 35 on a lower portion of the outer body 22. As shown in FIG. 6, the emission intake tube 23 can be constructed of three tubular members 40, 41, and 42. The larger diameter outer tube 40 has a hose coupling 34. An intermediate tube 41 is used to couple tube 42, which has a smaller diameter to the outer tube 40. The outer tube 40 is brazed to an orifice 37 in the outer body 22.

Figure 7:
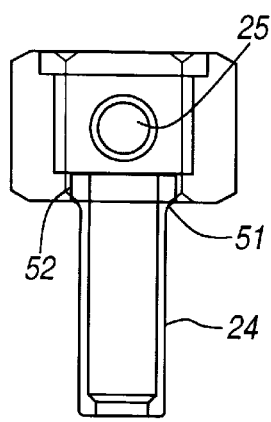
FIG. 7 depicts a lower extension tube coupled to the main body.

FIG. 7 depicts the outer body 22 of one embodiment of the current invention. The outer body 22 has a hexagonal outer surface and chamber defined therein. The hexagonal outer surface functions to assist in the installation of the heater into the air intake manifold. The lower extension tube has a mounting flange 51 which is inserted by a interference fit into bore 52. The components are then brazed or soldered together to fluidly seal and join the components.

Figure 8:
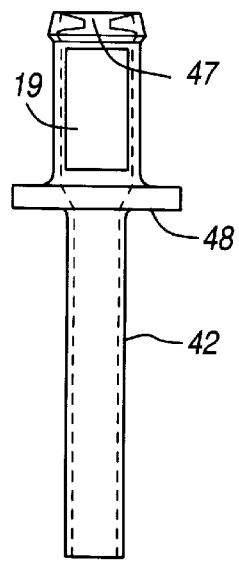
FIG. 8 depicts an emission intake tube sub-component of the current invention.

FIG. 8 depicts an emission intake tube sub-component of the current invention. Shown is a mounting flange 48 which is used to couple the emission intake tube 23 to the outer body 22. The emission intake tube 23 further has a restricted orifice 47 to regulate the amount of engine off gasses being drawn into the vehicle engine.

Figure 9:
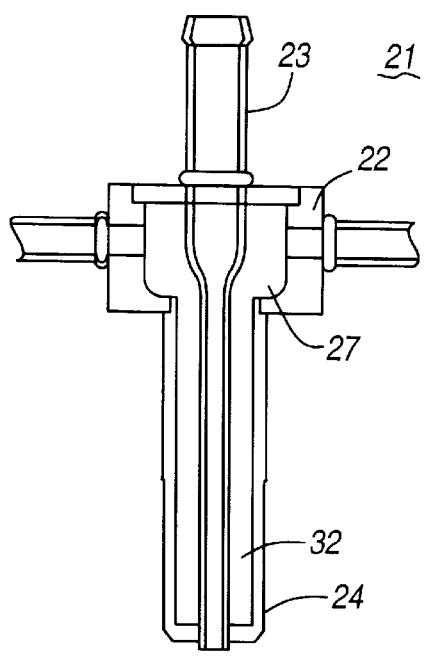
FIGS. 9 and 10 depict alternate embodiments of the current invention.
Figure 10:
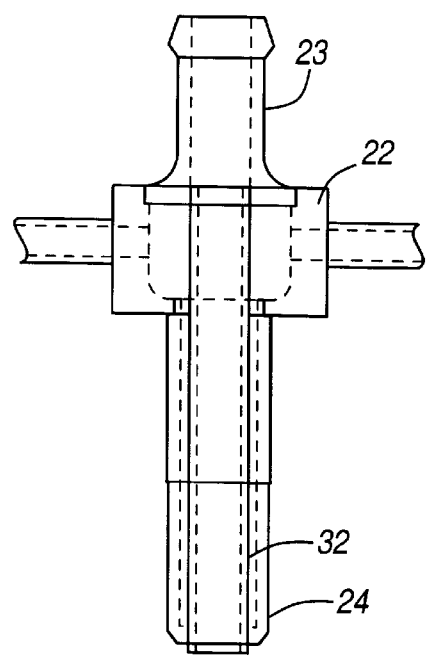

FIGS. 9 and 10 depict alternate embodiments of the current invention. Specifically shown, are different methods of coupling the emission intake tube 23 to the outer body 22. As can be seen, the emission intake tube 23 can have a variety of shapes which allow for varying amount of fluids to be circulated through the toroidal and cylindrical chambers 27 and 32. Further shown is that the lower extension tube 24 can have a varying number of outer dimensions and threads to readily couple the off gas intake heater 21 to the engine. It is preferable that the outer diameter of the lower extension tube 24 be from 3 to 6 millimeters.

Figure 11:
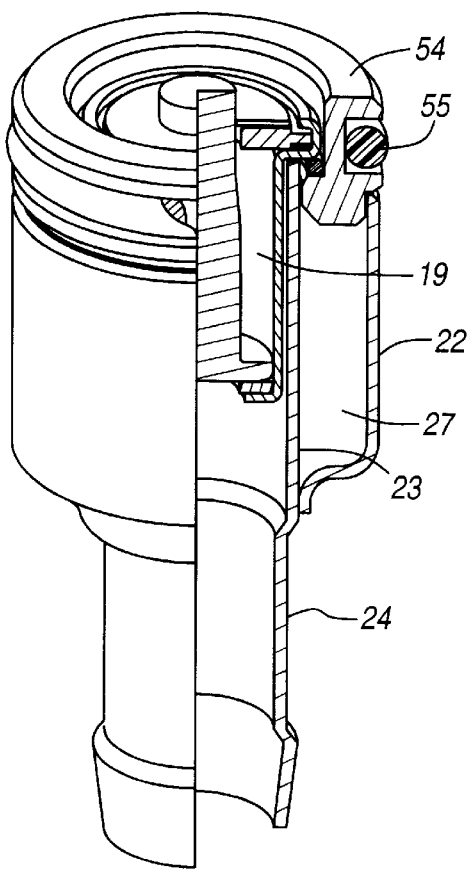
FIGS. 11 and 12 depict cross-sections of an alternate embodiment of the current invention.
Figure 12:
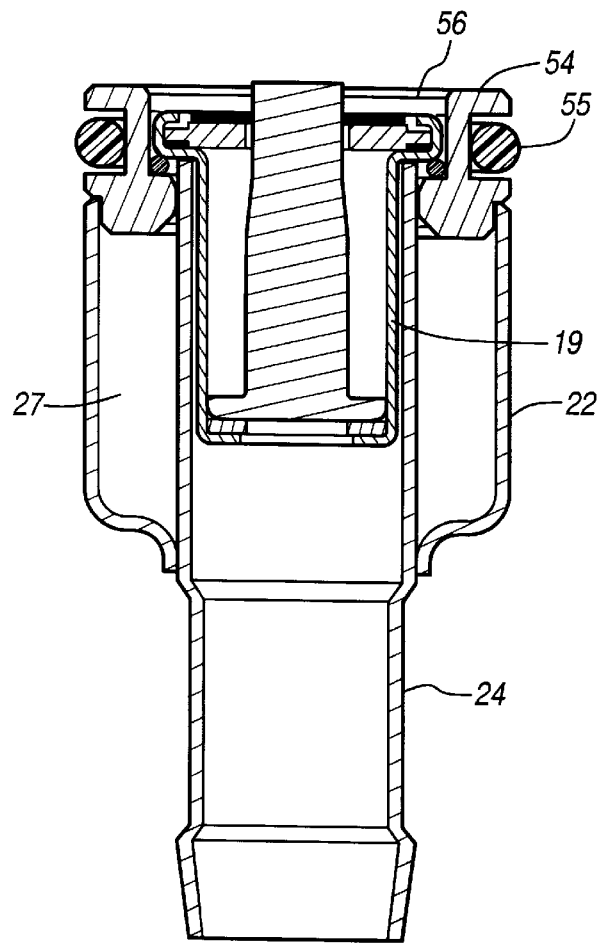

FIGS. 11 and 12 depict a cross-sectional view of an alternate embodiment of the current invention. Shown is the use of a PCV valve cartridge 53 which incorporates the PCV valve 19 into a easily deposited housing. The PCV valve cartridge 53 is disposed within a cap portion 54 which functions to couple the PCV valve 19 to the emission intake tube 23. Disposed about the cap 54 is a O-ring 55 which is used to seal the gas intake heater 21 to the air intake manifold 20. The retaining member 56 is used to couple the PCV valve cartridge 53 to the cap 54. It is specifically envisioned that the PCV valve can be incorporated into any of the gas intake heaters 21 depicted in FIGS. 1–10.

Figure 13:
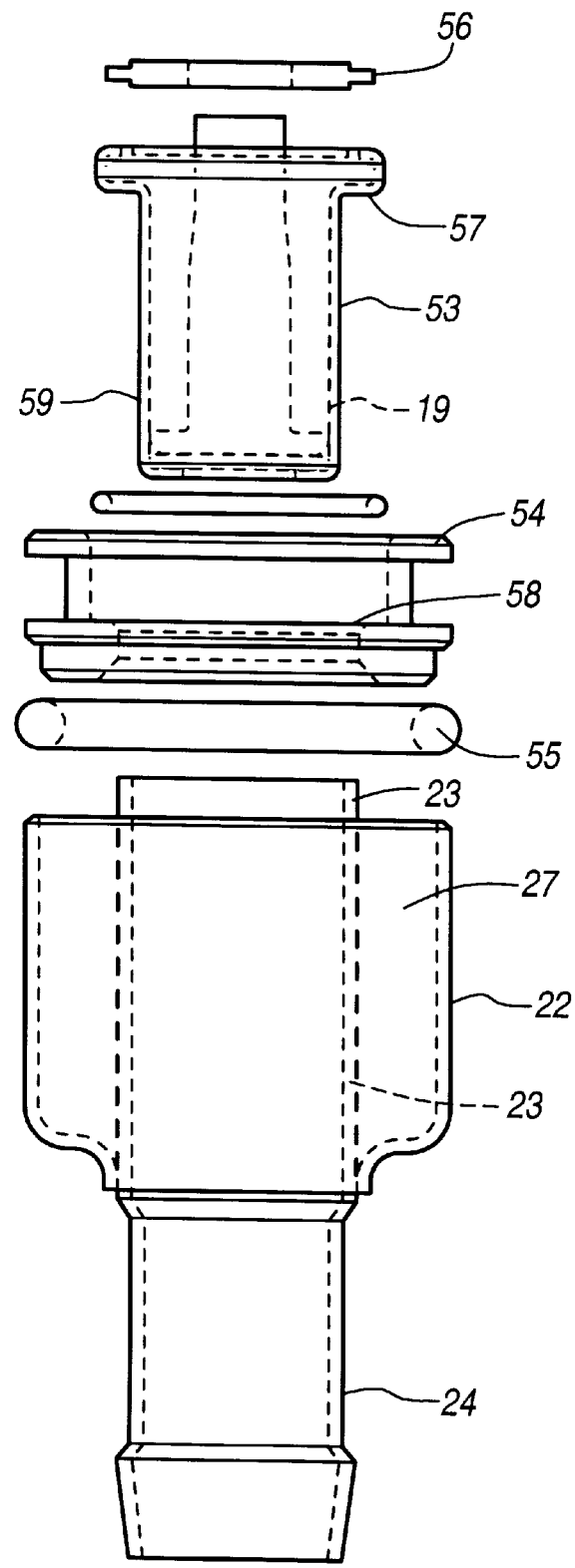
FIG. 13 depicts an exploded view of the emission intake heater as shown in FIGS. 11 and 12.

FIG. 13 depicts an exploded view of the gas intake heater 21 as depicted in FIGS. 11 and 12. As can be seen, a subassembly is produced which is formed by the emission intake tube 23, lower extension tube 24, and main outer body 22. Disposed on top of this subassembly is the cap portion 54 which functions to seal the toroidal chamber 27 formed by the outer body 22 and the emission intake tube 23. Disposed within the cap 54 is the PCV cartridge 53. The PCV cartridge 53 has an outer ledge 57 which functions to couple to a surface 58 within the cap 54. The PCV cartridge 53 further has a lower body portion 59 which is disposed within the emission intake tube 23. The entire assembly is closed using the retaining member 56 and brazed together using standard manufacturing techniques.

Figure 14:
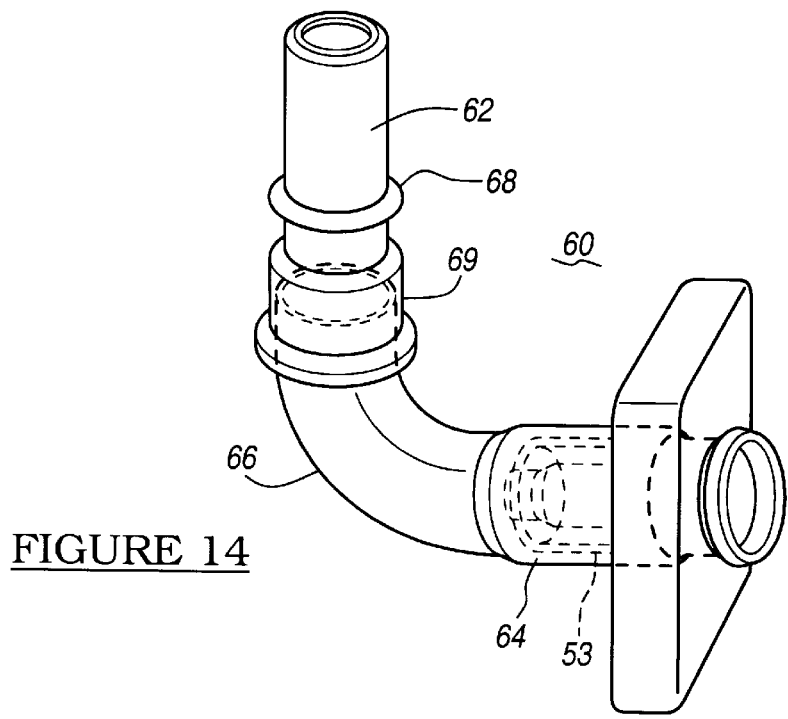
FIG. 14 depicts an alternate embodiment of the emission intake heater.

FIG. 14 depicts an alternate embodiment of the emission intake heater 60. The emission the intake heater 60 is a generally L-shaped cylindrical tube formed by a first leg 62, a second leg 64, and a curved transition portion 66. The first leg 62 of the emission intake heater 60 is coupled to a hose (not shown), which takes the engine off gas and provides them to the air intake manifold. The first leg 62 defines rib 68, which mates the first leg 62 to a quick coupler (not shown) on the hose. Additionally, the first leg 62 defines a coupling region 69 used to couple the emission intake heater 60 to a bore 70 defined by the valve cover.

The second leg 64 of the emission intake heater 60 is formed by a first section 72 having a first diameter and a second section 74 having a second diameter. Incorporated within the first section 72 is an internal PCV cartridge 53. Disposed about the second section 74 is a grommet or sealing mechanism 78, which will be further described below.

Figure 15:
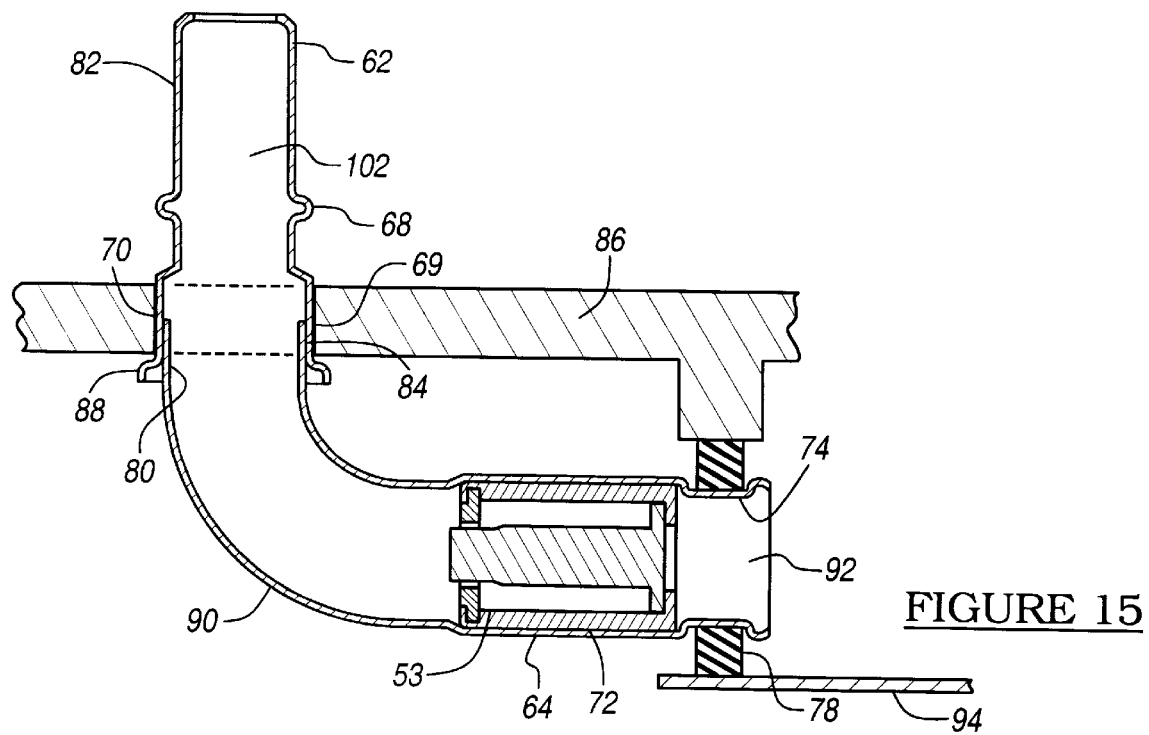
FIG. 15 depicts a cross-sectional view of the emission intake heater of FIG. 14 within an engine valve cover.

As best seen in FIG. 15, the first leg 62 is formed by two tubular members 80 and 82. The first tubular member 80 is an extension of the curved transition portion 66. The second tubular member 82 is annularly coupled to the first tubular member 80 at a braze joint 84. The second tubular member 82 defines the coupling region 69 that couples the emission intake heater into the bore 70 valve cover 86 for an engine. The coupling region 69 uses a press fit connection, which allows for a simple mechanism for replacement of the emission intake heater 60 during service. Formed adjacent to the press fit connection is a sealing flange 88, which assists in the sealing of the press fit joint between the emission intake heater and the valve cover 86. It is, however, envisioned that any type of coupling mechanism which will couple the emission intake heater 60 to the valve cover 86 can be used.

FIG. 15 depicts a cross-sectional view of the emission intake heater 60 of FIG. 14 within the engine valve cover 86. The emission intake heater 60 is positioned so that heated oil, which is agitated within the valve cover 86, splashes the exterior surface 90 of the emission intake heater 60 to heat the off gasses from the oil. An opening 92, defined by the second leg 64, is disposed in a first region of the valve cover 86 so that it is shielded from the hot oil. Disposed between the valve cover 86 and the opening 92 defined in the first leg 62 is a baffle 94. The baffle 94 functions to prevent hot oil from being splashed into the opening 92 of the emission intake heater 60. In order to seal the emission intake heater 60 to the baffle 94, a grommet 78 is used to isolate the exterior surface 90 of the emission intake heater 60 from the opening 92. The PCV valve cartridge 53 can be incorporated into either the first leg 62, second leg 64, or any location between the valve cover 86 and the engine intake.

Figure 16:
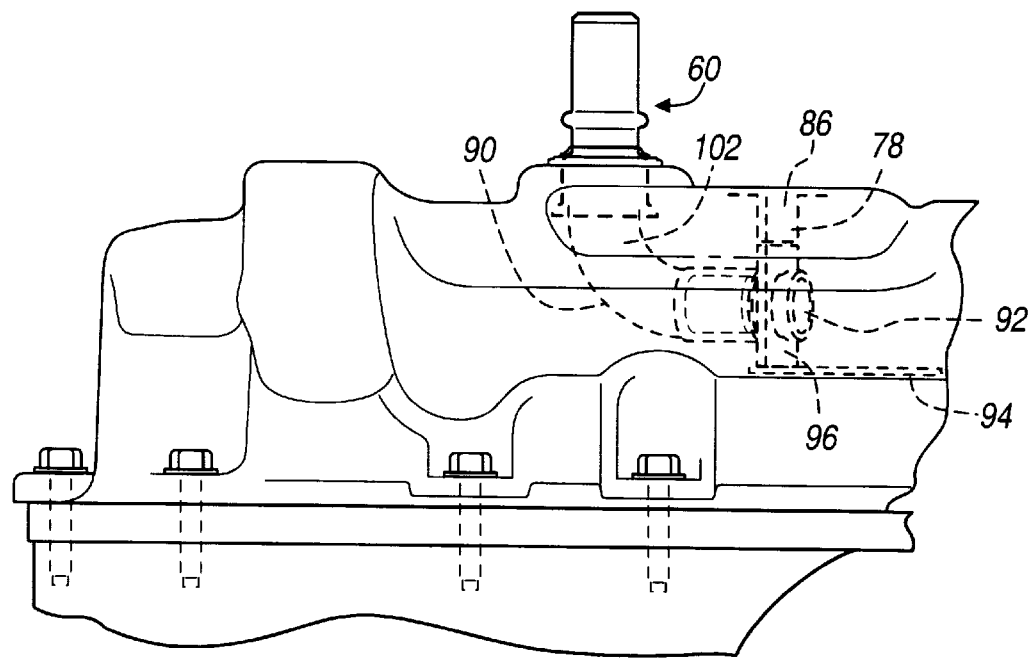
FIG. 16 depicts a side view of the engine intake heater of FIG. 14 within an engine a valve cover.
Figure 17:
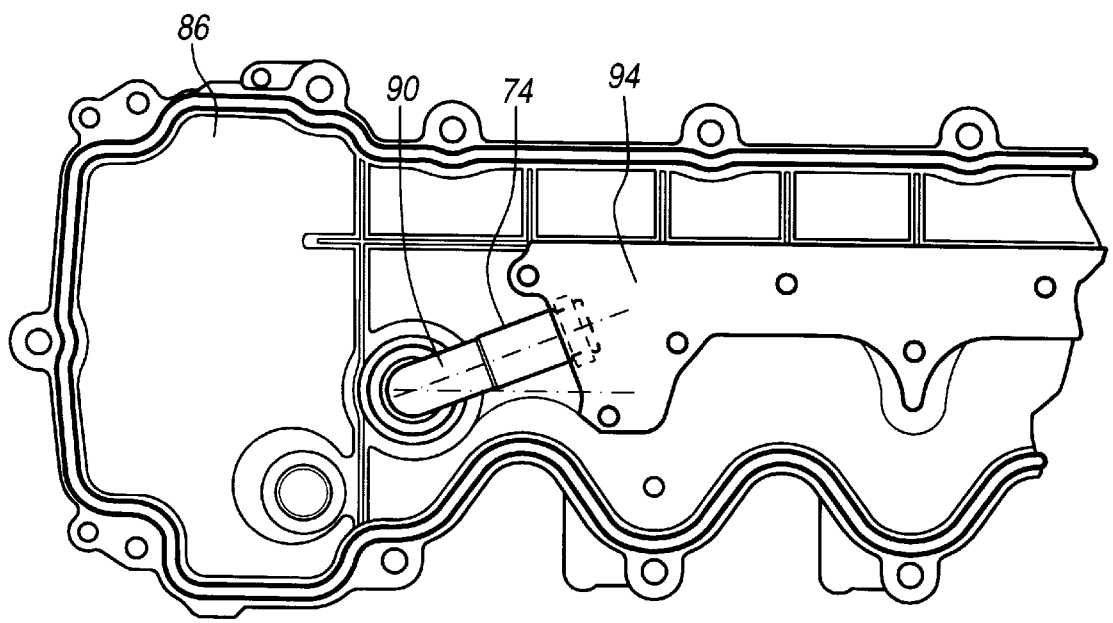
FIG. 17 shows an interior view of an engine valve cover incorporating the engine intake heater of FIG. 14.

FIGS. 16 and 17 depict side and interior views of a valve cover 86 incorporating the engine intake heater 60 of FIG. 14. The valve cover 86 defines a first oil containing interior cavity 96 and a second generally oil free cavity 98. The first and second cavities 96 and 98 are separated by a flange member 100 and the baffle 94. The engine intake heater 60 fluidly couples the second cavity to the engine air intake manifold. Additionally, the engine intake 60 heater, in passing through the first chamber 96, functions to provide a heat exchange surface 90 which is in contact with heated engine oil. This functions to heat the off gasses from the second chamber 98 prior to the introduction of the off gasses into the engine intake manifold.

The emission intake heater 60 functions to provide a mechanism for utilizing oil circulating within an engine valve cover 86 as a heat exchange fluid for transferring heat from the engine to the engine off gasses prior to the off gasses leaving the engine. Essentially, the engine intake heater provides a passage 102 within the valve cover 86 that exposes the engine off gasses from heat from circulating oil. It is preferred that the PCV valve be incorporated into this passage 102, but it can be located at any point between the valve cover 86 and the engine air intake.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention.

What is claimed is:

1. A heater for an engine emission intake system disposed within an engine valve cover which uses engine oil to warm emission gasses being introduced into the air intake of an engine comprising:
    a tubular member defining a passage from inside the engine valve cover to outside of the valve cover, said tubular member having an exterior surface exposed to the engine oil to transfer heat from the engine oil to the emission gasses; and
    a baffle disposed between the engine oil and the passage configured to prevent engine oil from entering the passage;
    wherein the emission intake heater functions to provide a mechanism for utilizing engine oil circulating within an engine valve cover as a heat exchange fluid for transferring heat from the engine to the engine off gasses prior to the off gasses leaving the engine.

2. The heater according to claim 1 further comprising a PCV valve.

3. The heater according to claim 1 wherein said tubular member is a generally L-shaped cylindrical tube formed by a first leg and a second leg, the first and second legs being joined by a curved transition portion.

4. The heater according to claim 3 further comprising a PCV valve disposed with the second leg and wherein said first leg is coupled to the valve cover.

5. The heater according to claim 3 further comprising a grommet disposed about an exterior surface of said tubular member.

6. The heater according to claim 3 wherein said second leg is coupled to the valve cover by a press fit joint.

7. An engine valve cover comprising:
    a member defining a first oil containing interior cavity and a second generally oil free cavity;
    engine emission intake heater, wherein the engine emission intake heater fluidly couples the second cavity to an engine air intake manifold and wherein the emission intake heater is configured to provide a mechanism for utilizing oil circulating within an engine valve cover as a heat exchange fluid for transferring heat from the engine to the engine off gasses prior to the off gasses leaving the engine.

8. The engine valve cover according the claim 7 wherein the first and second cavities are separated by a flange member and a baffle.

9. The engine valve cover according the claim 8 wherein engine intake heater further comprises a grommet disposed about an exterior surface of the intake heater and wherein said grommet is disposed within flange.

10. The engine valve cover according to claim 7 wherein the emission intake heater defines a passage within the valve cover configured to expose the engine off gasses from heat from circulating oil within the first cavity.

11. The engine valve cover according to claim 10 further comprising a PCV valve disposed within said passage.

12. The engine valve cover according to claim 10 wherein said engine intake heater is a generally L-shaped cylindrical tube formed by a first leg and a second leg which defines an off gas receiving bore, the first and second legs being joined by a curved transition portion.

13. A heater for an engine emission intake system disposed within an engine valve cover for removing engine emission off gasses comprising:
    a member defining a passage from inside the engine valve cover to outside of the valve cover, said member having an exterior surface exposed to engine oil to transfer heat from the oil to the emission off gasses, the member being formed by a first leg and a second leg, the first and second legs being joined by a transition portion;
    wherein the emission intake heater is configured to utilize engine oil circulating within the engine valve cover as a heat exchange fluid for transferring heat from the engine to the engine off gasses prior to the off gasses leaving the engine.

14. The heater for an engine emission intake system according to claim 13 wherein the first leg defines the coupling region that couples the emission intake heater to the valve cover.

15. The heater for an engine emission intake system according to claim 14 wherein the coupling region defines a press fit connection.

16. The heater for an engine emission intake system according to claim 13 wherein the first leg defines a rib, which mates the first leg to a quick coupler and a coupling region configured to couple the heater to the valve cover.

17. The heater for an engine emission intake system according to claim 13 further comprising a PCV valve disposed within said first leg.

18. The heater for an engine emission intake system according to claim 13 further comprising a grommet disposed about an exterior surface of said member.

19. The heater for an engine emission intake system according to claim 13 further comprising a baffle configured to prevent engine oil from entering the heater.

* * * * *